United States Patent [19]

Berwanger

[11] Patent Number: 5,273,140
[45] Date of Patent: Dec. 28, 1993

[54] BRAKE DISC ANNULAR DRIVE INSERT

[75] Inventor: Fred W. Berwanger, South Bend, Ind.

[73] Assignee: Allied-Signal Inc., Morristown, N.J.

[21] Appl. No.: 951,057

[22] Filed: Sep. 25, 1992

[51] Int. Cl.$^5$ ............................................. F16D 65/12
[52] U.S. Cl. ............................ 188/73.1; 188/218 XL
[58] Field of Search ............... 188/73.2, 218 XL, 71.5, 188/73.1; 192/107 R

[56] References Cited

U.S. PATENT DOCUMENTS

| | | | |
|---|---|---|---|
| 3,757,907 | 9/1973 | Crossman et al. | 188/218 XL |
| 3,907,076 | 9/1975 | Crossman et al. | 192/107 R X |
| 4,465,165 | 8/1984 | Bok | 192/107 R X |
| 4,469,204 | 9/1984 | Bok et al. | 188/218 XL |
| 4,511,021 | 4/1985 | Grider | 188/218 XL |
| 4,557,356 | 12/1985 | Petersen | 188/218 XL |
| 4,747,473 | 5/1988 | Bok et al. | 188/218 XL X |
| 4,863,001 | 9/1989 | Edmisten | 188/218 XL |

FOREIGN PATENT DOCUMENTS 1134959  4/1957  France ...................... 188/218 XL Primary Examiner—Robert J. Oberleitner
Assistant Examiner—Peter M. Poon
Attorney, Agent, or Firm—Larry J. Palguta; Leo H. McCormick; Robert A. Walsh

[57] ABSTRACT

The brake disc annular drive insert (20, 30, 50) comprises a single (20, 50) or two-part (30) generally cylindrical member with radially extending flanges (26, 36, 46, 56) at opposite axial ends thereof. The drive insert (20, 30, 50) includes a generally cylindrical body (22, 32, 52) having an opening (21, 31, 51) at one side thereof which extends diametrically into the body (22, 32, 52) and terminates at a point between the center of revolution (A) of the body (22, 32, 52) and an outer surface of the body (22, 32, 52). The opening (21, 31, 51) in the body (22, 32, 52) extends to an inner surface (24, 34, 54) of the body (22, 32, 52) to provide a generally rectangular opening (21, 31, 51) for receiving a spline (8) of a torque tube (6). The flanges may comprise either generally annular flanges shaped complementary with the generally cylindrical body and also may be truncated at a side opposite the opening in the body. The two-part drive insert (30) comprises one part (38) having one flange (36) and the body (32) with a radially inwardly extending shoulder (38A) defining an end of a recess (39) and a second part (40) which has the other flange (46) and includes an axially extending portion (42) having a radially outwardly extending shoulder (45) which can be entered rotatably into the recess (39) of the body (32) and engaged with the radially inwardly extending shoulder (38A).

21 Claims, 3 Drawing Sheets

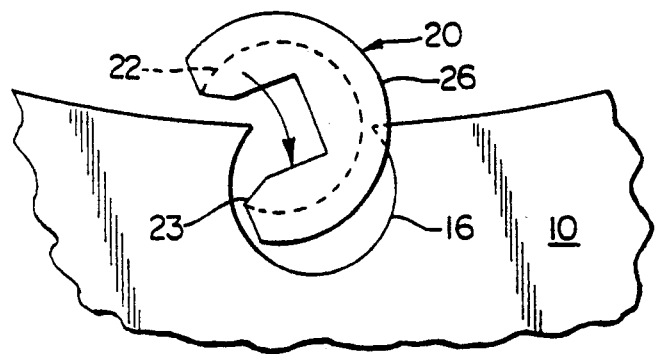
FIG. 5
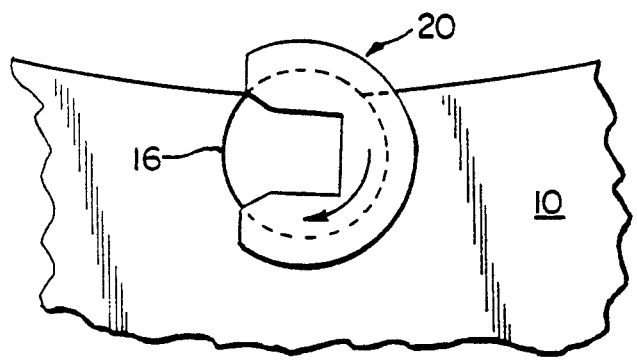
FIG. 6
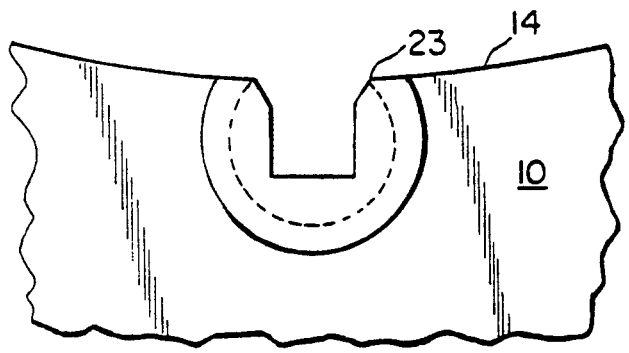
FIG. 7
FIG. 8
| DRIVE MECHANISM | STOP NO. | STATOR FAILURE TORQUE | AVE TORQUE INCREASE/OE |
|---|---|---|---|
| OE Baseline | 1 | 50,800 | (0%) |
|  | 2 | 53,460 |  |
| Drive on Steel Reinforcing Side Plates | 3 | 53,634 | 14.5% |
|  | 4 | 62,703 |  |
| Drive on Carbon with Steel Reinforcing Plates as Backup | 5 | 52,200 | -1.3% |
|  | 6 | 50,753 |  |
| Round Inserts in Round Stator Drive Slots | 7 | 64,054 | 23.3% |
|  | 8 | 64,456 |  |

BRAKE DISC ANNULAR DRIVE INSERT

The present invention relates generally to a brake disc drive insert, and in particular to an annular drive insert which is received rotatably within a generally annular opening within the brake disc.

In brake assemblies which employ a plurality of brake discs alternatingly splined to the wheel and axle of an aircraft, it is important to provide specially constructed drive means to reinforce the peripheral slots in the discs and relieve the severe stressing that otherwise would rapidly deteriorate the periphery of the discs. Carbon-carbon composite brake discs have improved braking and heat sink characteristics and have become more widely utilized. It is important to provide reinforcing inserts at the peripheral slots of the discs because the carbon-carbon composite brake discs have less strength than steel. The problem with the use of metallic inserts is that the inserts transmit the forces directly to the carbon discs, which are subject to cracking or crumbling if the forces are not properly dispersed. Examples of inserts provided for carbon-carbon composite brake discs are provided by Cook et al U.S. Pat. No. 3,800,392; Stimson et al U.S. Pat. No. 3,934,686; Jannasch et al U.S. Pat. No. 3,972,395; Berger U.S. Pat. No. 4,007,814; Pinter U.S. Pat. No. 4,083,434; Bok U.S. Pat. No. 4,465,165; Bok et al U.S. Pat. No. 4,469,204; Grider U.S. Pat. No. 4,511,021; Petersen U.S. Pat. No. 4,557,356; and Edmisten U.S. Pat. No. 4,784,246.

The present invention provides solutions to the above problems by providing a drive insert in combination with a brake disc, the disc comprising a generally annular member having therein a central generally annular opening, and an edge surface of the disc having at least one annular recess extending radially into said disc, the drive insert comprising a generally cylindrical body having one side of said body truncated to provide an insert opening which extends axially through the body and diametrically into the body along a diameter of said body such that the insert opening terminates at an axially extending surface located between the revolutional center of said body and an outer surface of the body, and end flanges extending from said body, each of said end flanges extending radially outwardly from the outer surface of said body to provide axial positioning of said drive insert relative to said disc, the body of the annular drive insert located rotatably within said annular recess and retained axially in place by said flanges which may engage opposite side surfaces of said disc.

The invention is described in detail below with reference to the drawings which illustrate embodiments in which:

FIGS. 5-7 illustrate the insertion of the annular drive insert into the annular slot or opening of the brake disc; and FIG. 8 is a graph illustrating the average torque increase over other methods provided by coupling a brake disc with the torque tube via the annular drive insert of the present invention.

Figure 1:
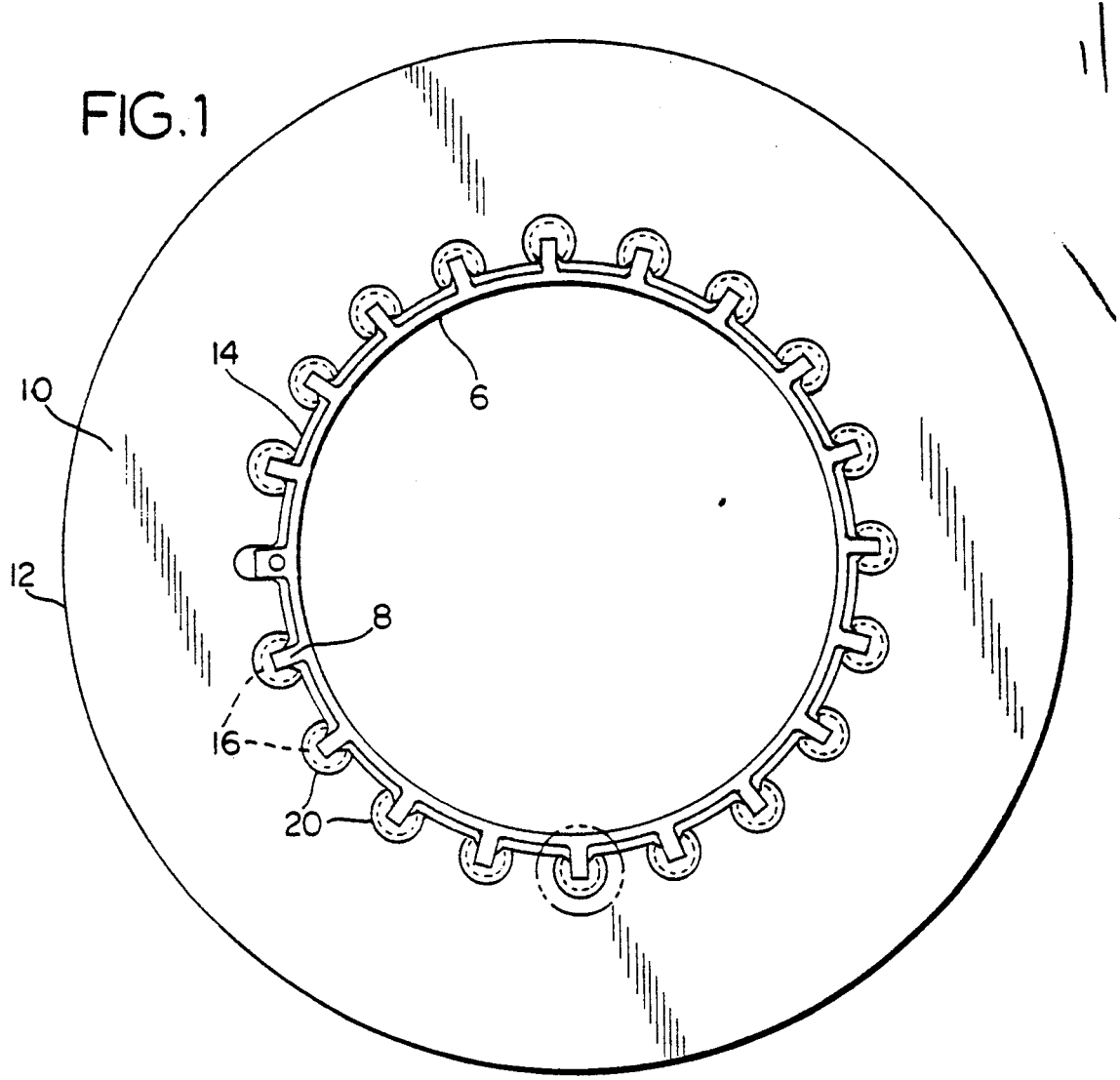
FIG. 1 is a view of an aircraft carbon-carbon composite brake disc coupled with a torque tube via annular drive inserts in accordance with the present invention.
Figure 2:
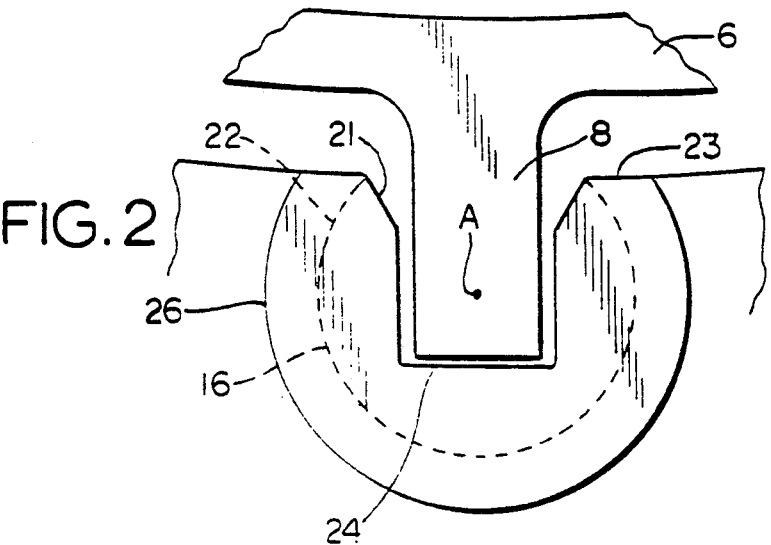
FIG. 2 is an enlarged view of the circled section of FIG. 1.

Referring to FIG. 1, an aircraft carbon-carbon composite brake disc 10 is generally annular in shape and includes an outer diameter circumference 12 and a central generally annular opening 14. Located about the periphery of opening 14 is a plurality of slot openings or recesses receiving therein brake disc annular drive inserts 20 in accordance with the present invention. Recesses 16 of disc 10 are generally annular shaped slots extending radially outwardly from opening 14 of disc 10. Annular drive inserts 20 couple torque tube 6 with disc 10, the torque tube being non-rotatably coupled with a not shown axle of an aircraft. As illustrated in FIG. 2, torque tube 6 includes radially extending, short splines 8 which extend within openings 21 of respective annular drive inserts 20. Each annular drive insert 20 comprises a generally cylindrical body 22 which rotatably engages the surface of recess 16. Body 22 is truncated at side 23 and provides opening 21 which extends diametrically into cylindrical body 22. Opening 21 extends past the center of revolution A of body 22 and terminates in flat surface 24 (which can have alternatively a nonflat shape) located between the center of revolution A and the outer surface of cylindrical body 22. At opposite axial ends of cylindrical body 22 are radially extending flanges 26 which engage opposite sides of disc 10 to retain axially drive insert 20 within annular slot 16.

Although FIGS. 1, 2 and 5-7 illustrate the annular drive insert in combinatiion with a stator brake disc and a torque tube, the drive insert of the present invention can also be located rotatably in an annular recess at the outer circumferential edge surface of a rotor disc in order to couple the rotor disc with an aircraft wheel. The wheel would include either an integral axially extending drive boss or an attached drive key to provide a drive member coupled with the rotatable drive insert in the same manner that the torque tube spline is coupled with the drive insert rotatably positioned in the recess of the stator brake disc.

Figure 3A:
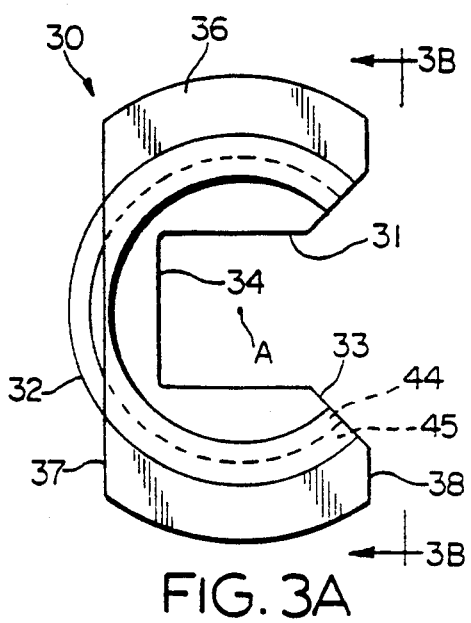
FIG. 3A is an end view of a second embodiment of the annular drive insert.
Figure 3B:
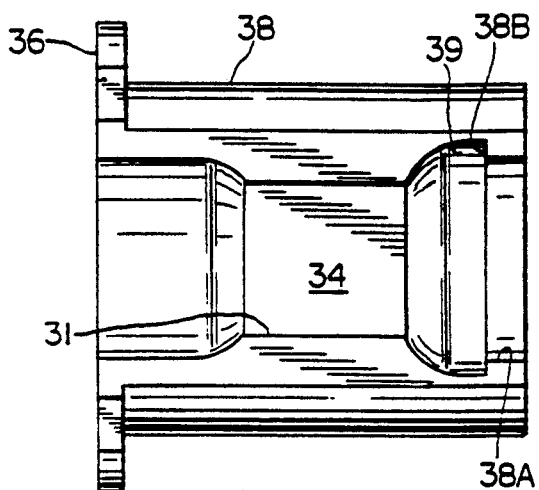
FIG. 3B is a view taken along view line 3B—3B of FIG. 3A and illustrating a first part of the annular drive insert illustrated in FIG. 3A.
Figure 3C:
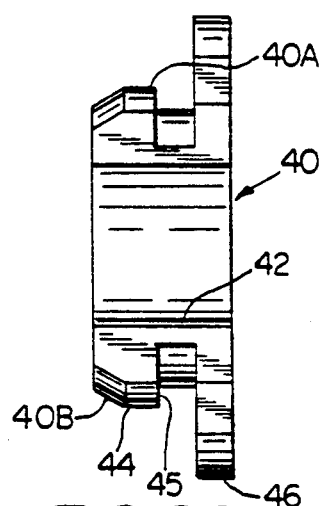
FIG. 3C is a view of the second part of the annular drive insert of FIG. 3A.

Referring to FIG. 3A, there is illustrated a second embodiment of the annular drive insert indicated generally by reference numeral 30. Annular drive insert 30 includes a generally cylindrically shaped axially extending body 32 truncated at side 33 to provide opening 31 which extends diametrically into body 32 and terminates at flat surface 34. Flange 36 is not only truncated at side 33 to match the shape of truncated body 32, but is truncated to provide a flat surface or portion 37 so that flange 36 will not interfere with other shoulders and body shapes located adjacent opening 14 of disc 10 and slightly radially outwardly of recesses 16. Annular drive insert 30 comprises an assembly made of two parts wherein first part 38 illustrated in FIG. 3B includes flange 36 and an axially opposite, radially inwardly extending shoulder 38A which defines an end of inner recess 39. Second part 40 illustrated (not to scale with FIG. 3B) in FIG. 3C includes flange 46 identical in size to flange 36, and axially extending portion 42 which includes radially outwardly extending portion 44. Radially outwardly extending shoulder 45 of portion 44 is received within recess 39 to engage shoulder surface 38B of first part 38 and retain together the two pieces. Second part 40 is coupled with first part 38 by positioning part 40 such that one of the ends 40A or 40B of portion 44 is slipped into recess 39 and then part 40 rotated relative to part 38 so that the flanges 36, 46 are aligned and portion 44 is located rotatably within recess 39.

Figure 4A:
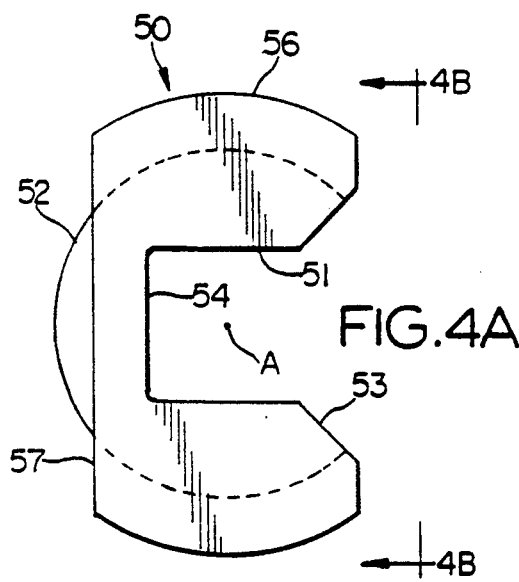
FIG. 4A is an end view of a third embodiment of the annular drive insert in accordance with the present invention.
Figure 4B:
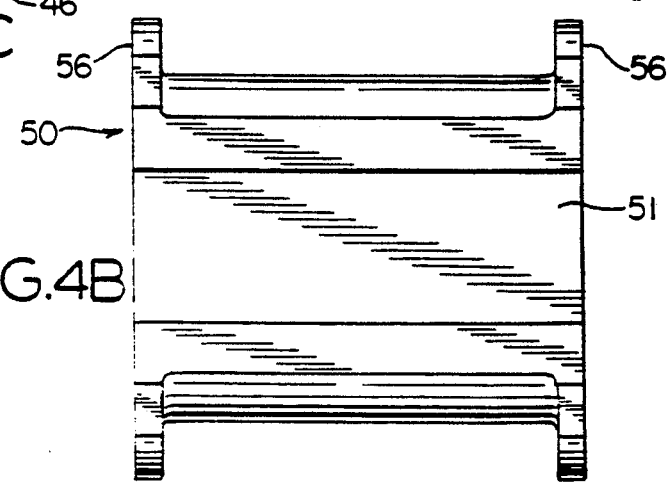
FIG. 4B is a view taken along view line 4B—4B of FIG. 4A.

FIG. 4A illustrates a third embodiment of the present invention wherein the annular drive insert is designated generally by reference numeral 50 which includes a generally cylindrically shaped axially extending body 52 having oppositely disposed radially extending flanges 56 (see FIG. 4B) and each flange having truncated flat surface 57. The cylindrical body is truncated at side 53 to provide opening 51 which extends to flat surface 54. Annular drive insert 50 is a single piece drive insert as illustrated in FIG. 4B and provides a generally rectangular shaped opening 51 for receiving therein a spline of an associated torque tube.

FIGS. 5-7 illustrate the insertion of the annular drive insert of the present invention within annular shaped slot or recess 16 of brake disc 10. Annular drive insert 20 (or 30 or 50) is aligned axially with recess 16 so that flanges 26 are located axially adjacent opposite sides of disc 10. Drive insert 20 is tilted so that truncated side 23 of truncated body 22 may be moved into generally annular shaped recess 16 (see FIG. 5). Once located within the slot so that body 22 may engage a portion of the circumference of annular recess 16, annular drive insert 20 is rotated as illustrated in FIG. 6 until it comes to the position illustrated in FIG. 7 wherein the truncated side 23 is substantially in alignment with the circumference of opening 14. After all of the drive inserts 20 are inserted in the respective annular recesses 16, brake disc 10 may be coupled with an associated torque tube.

The annular drive insert of the present invention provides substantial improvements over prior drive inserts utilized with carbon-carbon composite brake discs. Annular drive inserts have been shown to reduce the chipping of carbon-carbon composite brake discs during brake operation. The annular or round engagement of the body of the annular drive insert with the annular shaped recess of the brake disc provides for self-alignment of the insert to the disc during spline deflections, and the annular shaped disc recess 16 provides a larger stress-relieving radius than could be provided by a rectangular shaped disc slot or recess. Compared to prior, insertless disc drive constructions, the present invention provides for an additional load-bearing area. A full projected load-bearing area is available throughout a 180° sweep of load directions for each annular disc recess. The present invention enables shorter spline heights and provides for a greater radius within the associated disc recess 16. FIG. 8 is a chart illustrating the results of a static torque test of the annular drive insert as compared to prior designs. The original equipment base line test was run for a carbon-carbon composite stator brake disc having carbon slots engaged by metal splines of a torque tube. The second structure comprises a carbon-carbon composite brake disc having steel reinforcing side plates to provide the drive between the torque tube and carbon disc and which shows an average torque increase of 14.5% over the original equipment base line. The third drive mechanism was for a torque tube which engaged the carbon material at the recesses with adjacent steel reinforcing plates as a backup and this illustrates a −1.3% decrease in torque as compared to the original equipment base line. The utilization of the carbon-carbon composite brake discs (stops no. 7 and 8) provides an average torque increase of 23.3%, which is a significant improvement in the ability of the carbon-carbon composite brake material to withstand damage during high torque loading.

I claim:

1. A rotatable drive insert in combination with a brake disc, the disc comprising a generally annular member having therein a central generally annular opening, and the periphery of said annular opening defined by a circumferentially extending surface having at least one annular recess extending radially outwardly toward an outer circumference of said disc, the drive insert comprising a cylindrical body having one side of said body truncated to provide an insert opening which extends axially through the body, the insert opening extending into the body along a diameter of said body such that the insert opening terminates at an axially extending surface located between the revolutional center of said body and an outer surface of the body, and end flanges extending from said body, each of said end flanges extending radially outwardly from the outer surface of said body to provide axial positioning of said drive insert relative to said disc, the body of the drive insert located rotatably within said annular recess and retained axially in place by said flanges which may engage opposite side surfaces of said disc.

2. The rotatable drive insert and disc in accordance with claim 1, wherein the insert opening extending into said body is generally rectangular shaped to provide a seat for a spline member of tube.

3. The rotatable drive insert and disc in accordance with claim 2, wherein each of said flanges has a truncated portion disposed opposite from the one side of said body.

4. The rotatable drive insert and disc in accordance with claim 1, wherein said body and flanges comprise a two-part member, a first part comprising one of said flanges and said body including a shoulder, and a second part comprising the other flange and an axially extending portion with a shoulder which couples the second part with the shoulder of said body.

5. The rotatable drive insert and disc in accordance with claim 4, wherein the shoulder of the body comprises at one end of the body a radially inwardly extending shoulder which engages the shoulder of the second part that comprises a radially outwardly extending shoulder to couple the first and second parts together, the second part rotatable relative to the first part.

6. A rotatable drive insert in combination with a brake disc, the disc comprising a generally annular member having therein a central generally annular opening, and an edge surface of the disc having at least one annular recess extending radially into said disc, the drive insert comprising a cylindrical body having one side of said body truncated to provide an insert opening which extends axially through the body and diametrically into the body along a diameter of said body such that the insert opening terminates at an axially extending surface located between the revolutional center of said body and an outer surface of the body, and end flanges extending from said body, each of said end flanges extending radially outwardly from the outer surface of said body to provide axial positioning of said drive insert relative to said disc, the body of the drive insert located rotatably within said annular recess and retained axially in place by said flanges which may engage opposite side surfaces of said disc.

7. The rotatable drive insert and disc in accordance with claim 6, wherein the insert opening extending into said body is generally rectangular shaped to provide a seat for a drive member.

8. The rotatable drive insert and disc in accordance with claim 7, wherein each of said flanges has a truncated portion disposed opposite from the one side of said body.

9. The rotatable drive insert and disc in accordance with claim 6, wherein said body and flanges comprise a two-part member, a first part comprising one of said flanges and said body including a shoulder, and a second part comprising the other flange and an axially extending portion with a shoulder which couples the second part with the shoulder of said body.

10. The rotatable drive insert and disc in accordance with claim 9, wherein the shoulder of the body comprises at one end of the body a radially inwardly extending shoulder which engages the shoulder of the second part that comprises a radially outwardly extending shoulder to couple the first and second parts together, the second part rotatable relative to the first part.

11. A method of coupling a rotatable drive insert with a brake disc, the disc comprising an edge surface having at least one annular recess extending into said disc, the drive insert comprising a cylindrical body having one side of said body truncated to provide an insert opening which extends axially through the body and diametrically into the body along a diameter of said body such that the insert opening terminates at an axially extending surface located between the revolutional center of said body and an outer surface of the body, and end flanges extending radially outwardly from the outer surface of said body to provide axial positioning of said drive insert relative to said disc, comprising the steps of positioning the drive insert so that a portion of the body adjacent the insert opening enters the annular recess and the flanges located adjacent opposite sides of the disc, and rotating the body into the recess so that the insert opening faces generally toward said edge surface and the body rotatable in the recess and retained axially in place by said flanges.

12. The rotatable drive insert and disc in accordance with claim 11, wherein the rotation of the body into the recess terminates when the axially extending surface is disposed opposite the edge surface.

13. The rotatable drive insert and disc in accordance with claim 12, wherein each of said flanges has a truncated portion disposed opposite from the one side of said body.

14. The rotatable drive insert and disc in accordance with claim 11, wherein said body and flanges comprise a two-part member, a first part comprising one of said flanges and said body including a shoulder, and a second part comprising the other flange and an axially extending portion with a shoulder which couples the second part with the shoulder of said body.

15. The rotatable drive insert and disc in accordance with claim 14, wherein the shoulder of the body comprises at one end of the body a radially inwardly extending shoulder which engages the shoulder of the second part that comprises a radially outwardly extending shoulder to couple the first and second parts together, the second part rotatable relative to the first part.

16. A rotatable drive insert in combination with a carbon-carbon composite brake disc, the disc comprising a generally annular member having therein a central generally annular opening, and an edge surface of the disc having at least one annular recess extending radially into said disc, the drive insert comprising a cylindrical body having one side of said body open to provide an insert opening which extends axially through the body and diametrically into the body, and end flanges extending from said body, each of said end flanges extending radially outwardly from the outer surface of said body to provide axial positioning of said rotatable drive insert relative to said disc, the body of the drive insert located rotatably within said annular recess and retained axially in place by said flanges which may engage opposite side surfaces of said disc, the rotatable drove insert being rotatable relative to the annular recess and carbon-carbon composite brake disc so that the drive insert is self-aligning relative to the disc.

17. The rotatable drive insert and disc in accordance with claim 16, wherein the insert opening extending into said body is generally rectangular shaped to provide a seat for a drive member.

18. The rotatable drive insert and disc in accordance with claim 17, wherein each of said flanges has a truncated portion disposed opposite from the one side of said body.

19. The rotatable drive insert and disc in accordance with claim 16, wherein said body and flanges comprise a two-part member, a fist part comprising one of said flanges and said body including a shoulder, and a second part comprising the other flange and an axially extending portion with a shoulder which couples the second part with the shoulder of said body.

20. The rotatable drive insert and disc in accordance with claim 19, wherein the shoulder of the body comprises at one end of the body a radially inwardly extending shoulder which engages the shoulder of the second part that comprises a radially outwardly extending shoulder to couple the first and second parts together, the second part rotatable relative to the first part.

21. The rotatable drive insert and disc in accordance with claim 16, wherein the rotatable drive insert consists of a single piece rotatable drive insert.

* * * * *